United States Patent
Cashen et al.

(10) Patent No.: US 11,828,937 B2
(45) Date of Patent: Nov. 28, 2023

(54) HEAD UP DISPLAY ASSEMBLY AND METHOD

(71) Applicant: Continental Automotive Systems, Inc., Auburn Hills, MI (US)

(72) Inventors: Daniel Cashen, Troy, MI (US); Andreas H Buechel, Sterling Heights, MI (US); George E Kachouh, Sterling Heights, MI (US); Eugen Vetsch, Nauheim (DE)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 17/378,008

(22) Filed: Jul. 16, 2021

(65) Prior Publication Data
US 2023/0019969 A1    Jan. 19, 2023

(51) Int. Cl.
*G02B 27/01* (2006.01)

(52) U.S. Cl.
CPC .................. *G02B 27/0101* (2013.01)

(58) Field of Classification Search
CPC ... G02B 27/01–0189; G02B 2027/0105–0198; G03B 21/00–64; B60K 2370/00–98; B60K 35/00
See application file for complete search history.

(56) References Cited

U.S. PATENT DOCUMENTS

| | | | |
|---|---|---|---|
| 6,043,937 A | 3/2000 | Hudson et al. | |
| 10,942,350 B2 | 3/2021 | Kubo | |
| 2011/0181960 A1* | 7/2011 | Tanijiri | G02B 27/0172 359/630 |
| 2013/0100524 A1 | 4/2013 | Magarill et al. | |
| 2015/0234458 A1* | 8/2015 | Hsieh | B60R 1/00 345/156 |
| 2018/0284434 A1* | 10/2018 | Ogata | G03B 21/2033 |
| 2019/0031028 A1* | 1/2019 | Nambara | G02B 27/0101 |
| 2021/0356774 A1* | 11/2021 | Nakanishi | B60K 35/00 |

OTHER PUBLICATIONS

International Search Report and Written Opinion dated Oct. 28, 2022 from corresponding International patent application No. PCT/US2022/036794.

* cited by examiner

*Primary Examiner* — Bao-Luan Q Le
*Assistant Examiner* — Christopher A Lamb, II

(57) ABSTRACT

A head up display assembly includes an optical system (52) and a transmissive display. A light source is configured to projected a light through the transmissive display. A diffuser (64) is located between the optical system and the transmissive display (62).

17 Claims, 3 Drawing Sheets

HEAD UP DISPLAY ASSEMBLY AND METHOD

BACKGROUND

The present disclosure relates to a head up display for use in a vehicle. Head up displays in vehicles allow an image to be projected into a field of vision of the driver of the vehicle to allow information, such as speed or directions, to be within view of the driver while operating the vehicle. In order to display this information, the head up display unit is usually located in the dash of a vehicle.

SUMMARY

In one exemplary embodiment, a head up display assembly includes an optical system and a transmissive display. A light source is configured to projected a light through the transmissive display. A diffuser is located between the optical system and the transmissive display.

In another embodiment according to any of the previous embodiments, the optical system includes at least one mirror.

In another embodiment according to any of the previous embodiments, the optical system includes at least one magnifying lens.

In another embodiment according to any of the previous embodiments, a focal point (FP) of the optical system is located within the diffuser.

In another embodiment according to any of the previous embodiments, a focal point (FP) of the optical system is located closer to the diffuser than the transmissive display.

In another embodiment according to any of the previous embodiments, the transmissive display is an LCD display.

In another embodiment according to any of the previous embodiments, the transmissive display extends in a first plane. The diffuser extends in a second plane parallel to the first plane.

In another embodiment according to any of the previous embodiments, the transmissive display extends in a first plane. The diffuser extends in a second plane transverse to the first plane.

In another embodiment according to any of the previous embodiments, the first plane forms a tilt angle of between 10 and 30 degrees with the second plane.

In another embodiment according to any of the previous embodiments, the first plane and the second plane are non-perpendicular.

In another embodiment according to any of the previous embodiments, the optical assembly is configured to generate a virtual image in front of an operator's eye of between 2-15 meters (6.56-49.2 feet).

In another embodiment according to any of the previous embodiments, the diffuser and the display are spaced between 1 and 20 cm (0.39 and 7.87 inches) from each other.

In another exemplary embodiment, a method of reducing a temperature in a transmissive display in a head up display assembly includes collecting solar radiation with an optical system. The solar radiation is directed from the optical system to an image generator that has a diffuser separating a transmissive display from the optical system. The solar radiation is diffused with the diffuser in the image generator prior to the solar radiation reaching the transmissive display in the image generator.

In another embodiment according to any of the previous embodiments, a light source is located on an opposite side of the transmissive display from the diffuser.

In another embodiment according to any of the previous embodiments, a focal point (FP) of the optical system is located in the diffuser.

In another embodiment according to any of the previous embodiments, a focal point (FP) of the optical system is located closed to the diffuser than the display.

In another embodiment according to any of the previous embodiments, the transmissive display extends in a first plane and the diffuser extends in a second plane transverse to the first plane.

In another embodiment according to any of the previous embodiments, the first plane forms an angle of between 10 and 30 degrees with the second plane.

In another embodiment according to any of the previous embodiments, the first plane and the second plane are non-perpendicular.

In another embodiment according to any of the previous embodiments, the diffuser and the transmissive display are spaced between 1 and 20 cm (0.39 and 7.87 inches) from each other.

BRIEF DESCRIPTION OF THE DRAWINGS

The various features and advantages of the present disclosure will become apparent to those skilled in the art from the following detailed description. The drawings that accompany the detailed description can be briefly described as follows.

DESCRIPTION

Figure 1:
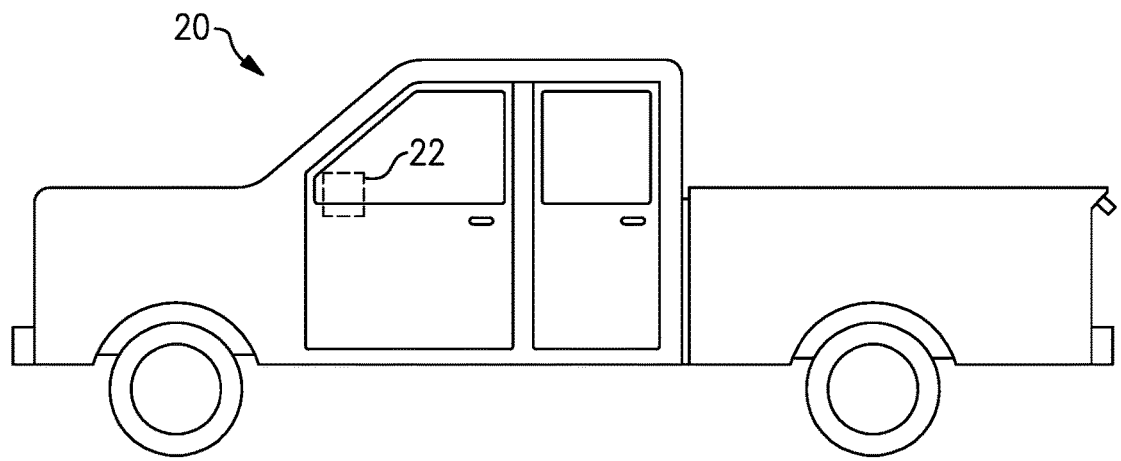
FIG. 1 illustrates a vehicle having an example head up display.
Figure 2:
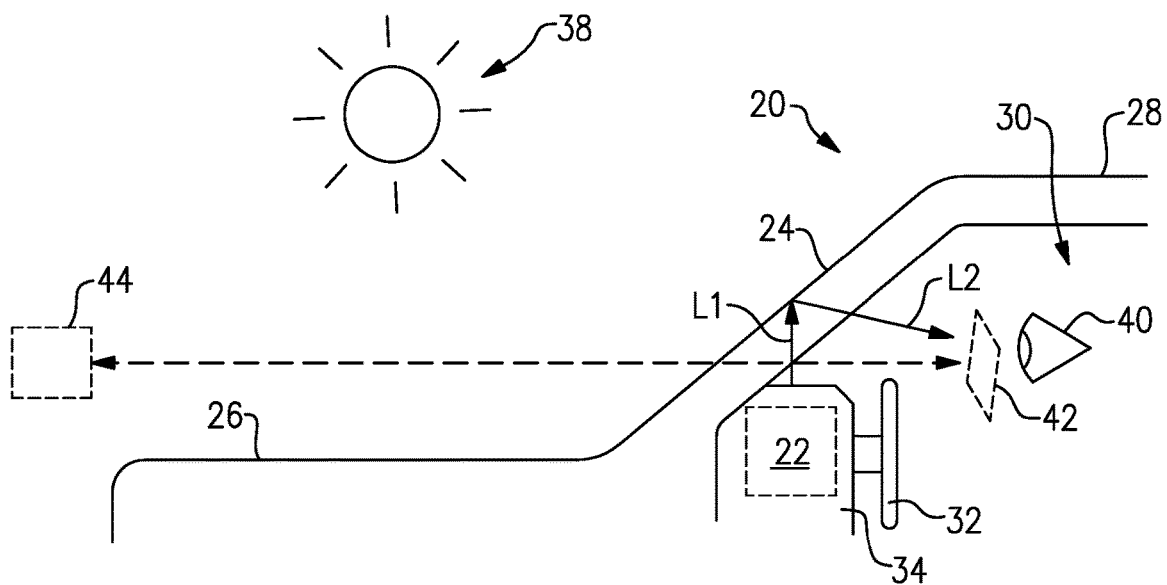
FIG. 2 schematically illustrates the head up display of FIG. 1 with an operator.

Referring to FIGS. 1 and 2, a vehicle 20 is shown schematically with an example head up display 22 ("HUD") for an operator of the vehicle 20. The vehicle 20 includes a windshield 24 located between a hood 26 and a roof 28 of the vehicle 20. A passenger cabin 30 contains the operator of the vehicle 20 and includes a steering wheel 32 located adjacent a dash 34 that supports the head up display 22 within view of the operator's eye 40. In the illustrated example, the windshield 24 acts as a transmissive screen for the head up display 22. However, a transmissive screen, such as a combiner, separate from the windshield 24 may be used to partially reflective light from the HUD 22 towards the operator's eye 40.

Figure 3:
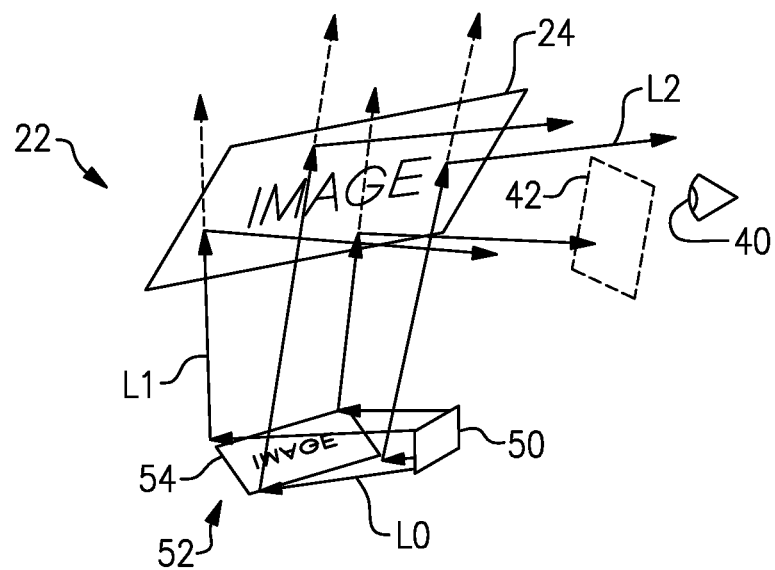
FIG. 3 illustrates operation of the head up display.

As shown in FIGS. 2 and 3, the HUD 22 generates optical beams L1, which are reflected at the windshield 24 and towards the operator's eye 40. As long as the eye 40 is within an eye box 42, the operator sees a virtual image 44 that appears to be outside the vehicle 20 in front of the windshield 24. The eye box 42 is a region in the passenger cabin 30 that the operator's eye 40 must be located in order to see the virtual image 44. In the illustrates example, the virtual image 44 appears in front of the operator's eye 40 at between 2 and 15 meters (6.56 and 49.2 feet) from the eye box 42.

In the vehicle 20, the head up display 22 provides critical vehicle information directly in the field of view of the operator. The information is delivered to the operator at a certain distance in front of the operator in order to reduce the need for the operator's eye 40 to move from a road in front of the operator to refocus to reading the vehicle's status shown in the virtual image 44. The placement of the virtual image 44 also reduces or eliminates accommodation time for the operator to refocus between the road and the dash 34. Previously, the operator would need to look at the dash 34 to view this information.

As shown in FIG. 2, the HUD 22 creates the virtual image 44 ahead of the windshield 24 or transmissive screen. The transmissive screen can be the windshield 24, or a separate partially reflective surface from the windshield 24, such as a combiner. The virtual image 44 is only visible from a limited region of space within the eye box 42.

In the illustrated example, the HUD 22 includes an image generator 50 that generates an optical beam L0. The optical beam L0 enters a generic optical system 52, here illustrated by an optical mirror 54, from which an optical beam L1 is directed to the windshield 24 or transmissive screen. A part of the light of beam L1 passes through the windshield 24, which is indicated by dotted arrows. Another part is reflected by the windshield 24 and thus reaches the operator's eye 40 when in the eye box 42 as an optical beam L2.

Figure 4:
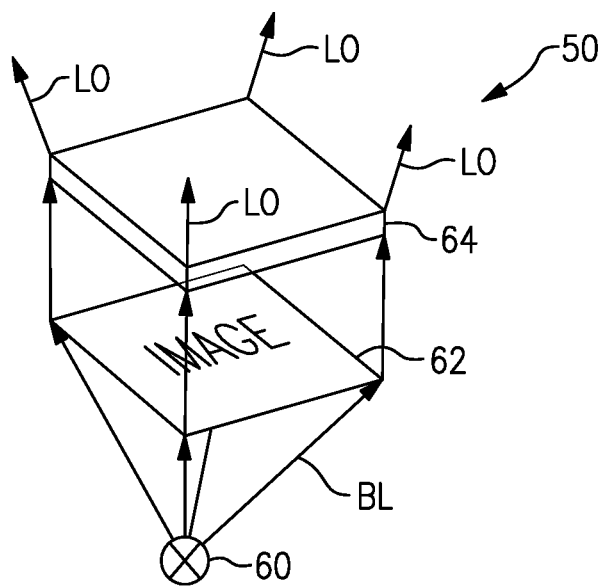
FIG. 4 illustrates an example image generator.

In the illustrated example of FIG. 4, the image generator 50 includes a light source 60, a transmissive display 62 and a diffuser 64. The transmissive display 62 may include a transmissive LCD display as opposed to a reflective display found in DLP systems. The light source 60 may include a backlight unit, such as with LEDs or any other type of light source that will emit backlight BL through the transmissive display 62 and the diffuser 64. The light source 60 illuminates the entire useful area of the transmissive display 62 to provide the entire usable surface of the display 62 with the same properties.

The optical system 52 may consist of one or more magnifying lenses 53 (FIG. 5) and/or planar or non-planar mirrors 54. These elements allow the optical information from the image generator 50 to be projected onto the windshield 24 and to transform the optical image in such a way as to create the virtual image 44 situated several meters in front of the operator's eye 40. As an alternative to using the windshield 24 as the transmissive screen, the transmissive screen may include a dedicated transparent screen, such as a combiner, placed in front of the driver's eye 40 and close to the windshield 24.

Figure 5:
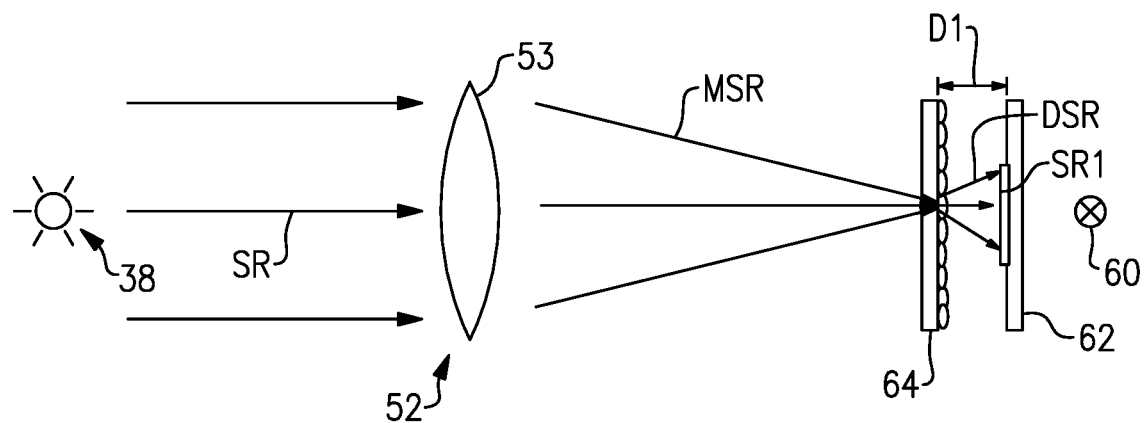
FIG. 5 schematically illustrates solar radiation entering the head up display with a diffuser and a transmissive display in a first orientation.

FIG. 5 schematically illustrates solar radiation SR received by the HUD 22. In the illustrated example, the solar radiation SR is emitted from a solar radiation source, such as the sun 38 or ambient light sources. The solar radiation SR is collected by the optical system 52 and directed towards the diffuser 64. The solar radiation SR is diffused by diffuser 64 towards the transmissive display 62. The optical system 52 focuses the solar radiation SR at a focal point FP adjacent the diffuser 64. The diffuser 64 then diffuses the solar radiation SR onto the transmissive display 62.

As the distance of the virtual image 44 extends further in front of the operator's eye 40, the focal point FP moves closer to the diffuser 64. The focal point FP corresponds to a location of elevated temperatures in the HUD 22 that the sensitive electronics, such as the transmissive display 62, must be capable of withstanding. Therefore, if the transmissive display 62 is immediately in front of the diffuser 64 and adjacent the transmissive display 62, the transmissive display 62 must be able to withstand the higher temperatures experienced at the focal point FP.

One feature of having the diffuser 64 separating the optical system 52 from the transmissive display 62 is a reduction in heat intensity experienced by the transmissive display 62. In particular, the diffuser 64 takes magnified solar radiation MSR from the optical system 52 and diffuses it to make diffused solar radiation DSR that is spread along a larger solar radiation area SR1 of the transmissive display 62 to reduce the generation of heat in the transmissive display 62. Additionally, as a distance D1 between the transmissive display 62 and the diffuser 64 increases, the solar radiation area SR1 will also increase. In the illustrated example, the distance D1 is approximately between 1 and 20 cm (0.39 and 7.87 inches).

As the diffuser 64 is able to withstand higher temperatures than the transmissive display 64, the focal point FP is able to safely move closer to the diffuser 64. Additionally, by reducing the amount of heat the transmissive display 62 is exposed to from solar radiation, a volume of the HUD 22 is able to decrease. This allows for improved packaging in the dash 34 of the vehicle 20 as the HUD no longer requires such large volumes as up to 30+ liters (7.93 gallons).

Additionally, as the location of the virtual image 44 is moved further in front of the vehicle 20, the focal point is moved closer to the diffuser 64. With the transmissive display 62 being adjacent the diffuser 64 or between the diffuser 64 and the optical system 52, an area of magnified solar radiation MSR on the transmissive display 62 would be smaller. The smaller area on the transmissive display 62 corresponds to an area of greater heat concentration and elevated temperatures. Additionally, the diffuser 64 could be asymmetric such that is has a greater amount of diffusion towards the transmissive display 62 than with light traveling towards the optical system 52. Therefore, an angle of diffusion of the diffuser 64 towards the transmissive display 62 is greater than an angle of diffusion of the diffuser 64 towards the optical system 52.

Figure 6:
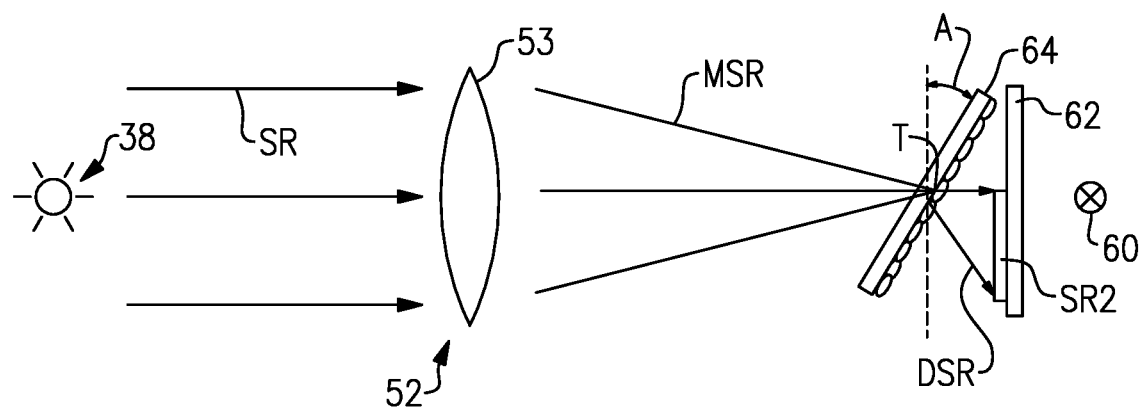
FIG. 6 schematically illustrates solar radiation entering the head up display with the diffuser and the transmissive display in a second orientation.

As shown in FIG. 6, the diffuser 64 may be tilted relative to the transmissive display 62. In particular, the transmissive display 62 and diffuser 64 in FIG. 5 each extend in a separate plane that are parallel to each other while the diffuser 64 in FIG. 6 is tilted relative to the transmissive display 62 such that the two components are not in parallel planes. The diffuser 64 is positioned at a tilt angle A of approximately 10-30 degrees in one example and at a tilt angle of between approximately 18-25 degrees in another example. By tilting the diffuser 64 at the tilt angle A relative to the transmissive display 62, a solar radiation area SR2 (FIG. 6) is larger than the solar radiation area SR1 (FIG. 5) for this same diffuser 64. This further dissipates the amount of heat generated from the sun 38 on the transmissive display 62. Additionally, the diffuser 64 is tilted about an axis T such that a distance from the axis T to the transmissive display 62 corresponds to the distance D1. Additionally, it is possible for the transmissive display 62 to be tiled about the tilt angle A.

Although the different non-limiting examples are illustrated as having specific components, the examples of this disclosure are not limited to those particular combinations. It is possible to use some of the components or features from any of the non-limiting examples in combination with features or components from any of the other non-limiting examples.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claim should be studied to determine the true scope and content of this disclosure.

What is claimed is:

1. A head up display assembly comprising:
   an optical system wherein the optical system includes at least one magnifying lens;
   a transmissive display;
   a light source configured to project a light through the transmissive display; and
   a diffuser located between the optical system and the transmissive display, wherein a focal point of the optical system is located within the diffuser.

2. The head up display assembly of claim 1, wherein the optical system includes at least one mirror.

3. The head up display assembly of claim 1, wherein the transmissive display is an LCD display.

4. The head up display assembly of claim 1, wherein the transmissive display extends in a first plane and the diffuser extends in a second plane parallel to the first plane.

5. The head up display assembly of claim 1, wherein the transmissive display extends in a first plane and the diffuser extends in a second plane transverse to the first plane.

6. The head up display assembly of claim 5, wherein the first plane forms a tilt angle of between 10 and 30 degrees with the second plane.

7. The head up display assembly of claim 5, wherein the first plane and the second plane are non-perpendicular.

8. The head up display assembly of claim 1, wherein the optical assembly is configured to generate a virtual image in front of an operator's eye of between 2-15 meters (6.56-49.2 feet).

9. The head up display assembly of claim 1, wherein the diffuser and the transmissive display are spaced between 1 and 20 cm (0.39 and 7.87 inches) from each other.

10. A method of reducing a temperature in a transmissive display in a head up display assembly, the method comprising:
    collecting solar radiation with an optical system;
    directing the solar radiation from the optical system to an image generator having a diffuser separating a transmissive display from the optical system, wherein a focal point of the optical system is located in the diffuser; and
    diffusing the solar radiation with the diffuser in the image generator prior to the solar radiation reaching the transmissive display in the image generator.

11. The method of claim 10, wherein a light source is located on an opposite side of the transmissive display from the diffuser.

12. The method of claim 10, wherein the transmissive display extends in a first plane and the diffuser extends in a second plane transverse to the first plane.

13. The method of claim 12, wherein the first plane forms an angle of between 10 and 30 degrees with the second plane.

14. The method of claim 12, wherein the first plane and the second plane are non-perpendicular.

15. The method of claim 10, wherein the diffuser and the transmissive display are spaced between 1 and 20 cm (0.39 and 7.87 inches) from each other.

16. A head up display assembly comprising:
    an optical system wherein the optical system includes at least one magnifying lens;
    a transmissive display;
    a light source configured to project a light through the transmissive display; and
    a diffuser located between the optical system and the transmissive display, wherein a focal point of the optical system is located closer to the diffuser than the transmissive display.

17. A method of reducing a temperature in a transmissive display in a head up display assembly, the method comprising:
    collecting solar radiation with an optical system;
    directing the solar radiation from the optical system to an image generator having a diffuser separating a transmissive display from the optical system, wherein a focal point of the optical system is located closer to the diffuser than the transmissive display; and
    diffusing the solar radiation with the diffuser in the image generator prior to the solar radiation reaching the transmissive display in the image generator.

* * * * *